US010215972B2

(12) United States Patent
Gyoda et al.

(10) Patent No.: US 10,215,972 B2
(45) Date of Patent: Feb. 26, 2019

(54) OPTICAL SYSTEM AND IMAGE PICKUP APPARATUS INCLUDING THE SAME

(71) Applicant: CANON KABUSHIKI KAISHA, Tokyo (JP)

(72) Inventors: Yuichi Gyoda, Utsunomiya (JP); Kohei Kimura, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/702,914

(22) Filed: Sep. 13, 2017

(65) Prior Publication Data
US 2018/0074300 A1 Mar. 15, 2018

(30) Foreign Application Priority Data

Sep. 14, 2016 (JP) .................................. 2016-179276

(51) Int. Cl.
G02B 15/14 (2006.01)
G02B 13/18 (2006.01)
G02B 9/22 (2006.01)
G02B 9/34 (2006.01)
G02B 9/62 (2006.01)
G02B 9/64 (2006.01)

(52) U.S. Cl.
CPC .............. *G02B 13/18* (2013.01); *G02B 9/22* (2013.01); *G02B 9/34* (2013.01); *G02B 9/62* (2013.01); *G02B 9/64* (2013.01)

(58) Field of Classification Search
CPC . G02B 13/18; G02B 9/62; G02B 9/34; G02B 9/64; G02B 9/22; G02B 15/177; G02B 13/22; G02B 13/009; G02B 27/646; G02B 13/04
See application file for complete search history.

(56) References Cited

U.S. PATENT DOCUMENTS

| 2013/0100305 | A1* | 4/2013 | Miyagawa | G02B 27/64 348/208.11 |
| 2014/0347546 | A1* | 11/2014 | Obikane | G02B 15/14 348/345 |
| 2016/0116734 | A1 | 4/2016 | Gyoda | |
| 2017/0254991 | A1 | 9/2017 | Gyoda | |

FOREIGN PATENT DOCUMENTS

| JP | 2013-88718 A | 5/2013 |
| JP | 2013-182054 A | 9/2013 |
| JP | 2014-89351 A | 5/2014 |
| JP | 2015-72499 A | 4/2015 |

* cited by examiner

*Primary Examiner* — Alicia M Harrington
(74) *Attorney, Agent, or Firm* — Carter, Deluca, Farrell & Schmidt LLP

(57) ABSTRACT

An optical system includes an aperture stop, and a focus lens unit arranged on an image side of the aperture stop, the focus lens unit having a negative refractive power and moving during focusing. The focus lens unit moves toward the image side during focusing from infinity to close distance. The focus lens unit includes a positive lens PL and a negative lens NL. An Abbe number vdNL of the material of the negative lens NL, a refractive index NdNL of the material of the negative lens NL at d-line, and an Abbe number vdPL of the material of the positive lens PL are set appropriately.

16 Claims, 9 Drawing Sheets

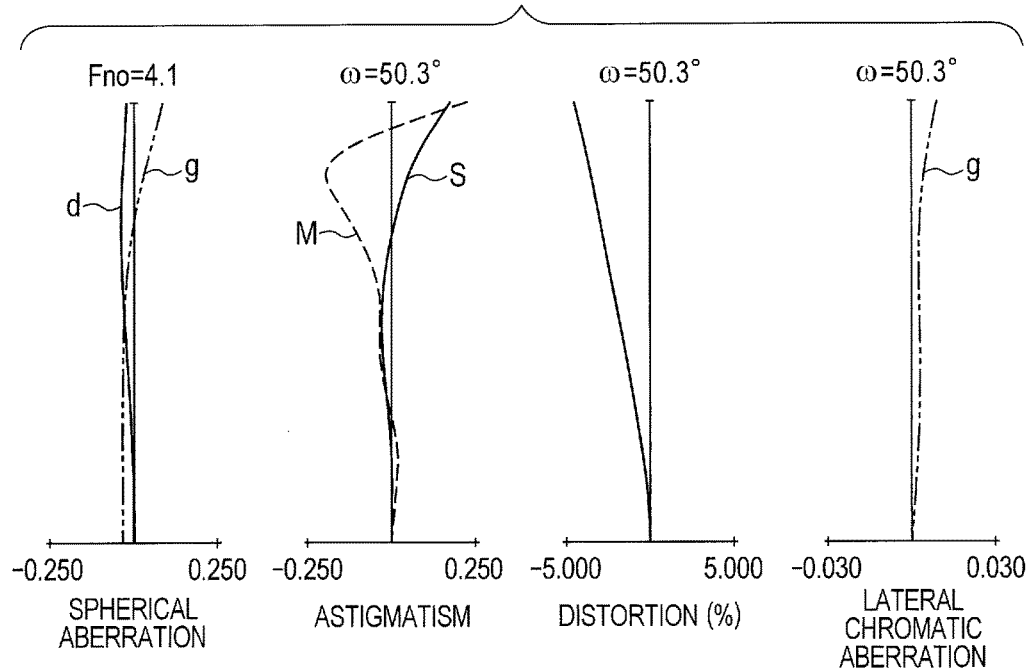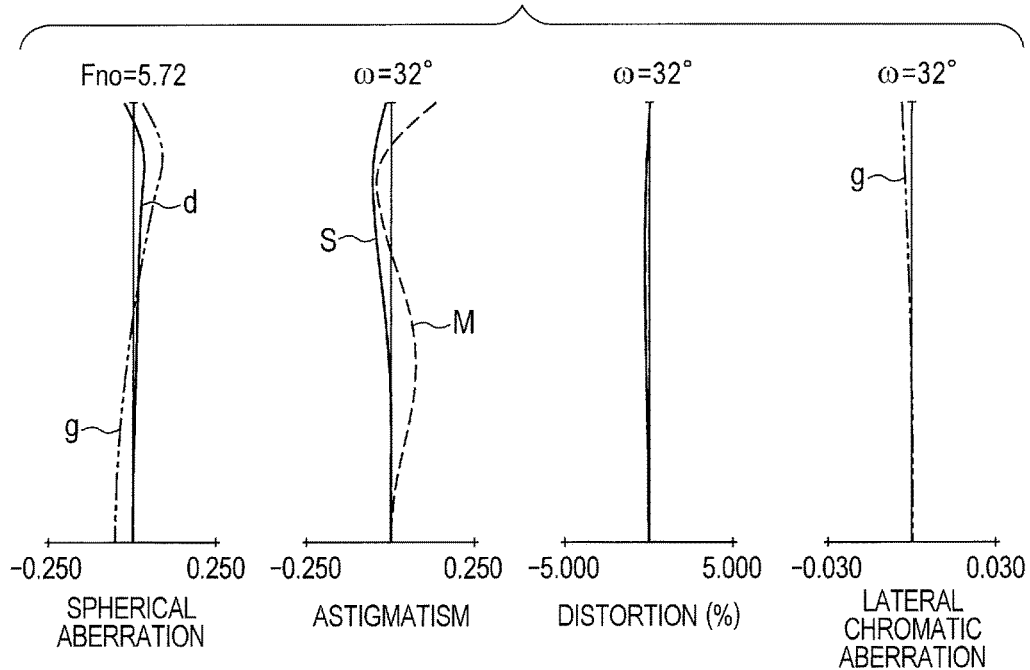

OPTICAL SYSTEM AND IMAGE PICKUP APPARATUS INCLUDING THE SAME

BACKGROUND OF THE INVENTION

Field of the Invention

The present invention relates to an optical system and an image pickup apparatus including the same, and is suitable as an image pickup optical system for image pickup apparatuses such as, for example, a digital camera, a video camera, a broadcast camera, a surveillance camera, and a silver-halide film camera.

Description of the Related Art

An image pickup optical system for use with an image pickup apparatus is required to easily focus on an object at close distance and have high optical properties over the entire range of object distance from infinity to close distance. In addition, the image pickup optical system is also required to achieve performance such as high focusing speed in auto-focusing. In order to perform quick focusing, a focus lens unit needs to be small and lightweight.

In an optical system, such as an image pickup optical system or a zoom lens, with a single focal length, a first lens unit on the object side tends to be large and heavy, in general. Heretofore, there have been known optical systems in which a small and lightweight lens unit arranged on the image side of the first lens unit on the object side is used to perform focusing (Japanese Patent Application Laid-Open No. 2015-72499, Japanese Patent Application Laid-Open No. 2014-89351, Japanese Patent Application Laid-Open No. 2013-88718, and Japanese Patent Application Laid-Open No. 2013-182054).

Japanese Patent Application Laid-Open No. 2015-72499 discloses a zoom lens which includes, in order from an object side to an image side, first to fifth lens units having positive, negative, positive, negative, and positive refractive powers, respectively, and which changes distances between the neighboring lens units for zooming. The zoom lens disclosed moves the fourth lens unit for focusing.

Japanese Patent Application Laid-Open No. 2014-89351 discloses an inner-focus type lens which includes, in order from an object side to an image side, first to third lens units having positive, negative, and positive refractive powers, respectively, and which moves the second lens unit for focusing.

Japanese Patent Application Laid-Open No. 2013-88718 discloses an image pickup lens which includes a front lens group, an aperture stop, and a rear lens group, and which performs focusing by using a lens unit arranged on the image side of the aperture stop and having a negative refractive power.

Japanese Patent Application Laid-Open No. 2013-182054 discloses a zoom lens which includes, in order from an object side to an image side, first to fourth lens units having negative, positive, negative, and positive refractive powers, respectively, and which changes distances between the neighboring lens units for zooming. The zoom lens disclosed moves the third lens unit for focusing.

An optical system for use with an image pickup apparatus is strongly required to be small and lightweight so as to achieve high-speed focusing, and also have optical properties such as one causing only small aberration variations in focusing.

If the number of lenses included in a focus lens unit is reduced in order to reduce the size and the weight of the focus lens unit, residual aberrations in the focus lens unit are large. This results in large aberration variations in focusing, and makes it difficult to obtain good optical properties over the entire range of object distance from infinity to close distance. In order to obtain an optical system in which a lens unit that moves for focusing (hereinafter, referred to as a focus lens unit) is small enough to achieve high-speed focusing and causes only small aberration variations in focusing, it is important to appropriately set the number of lens units, the refractive power and the lens configuration of each of the lens units, and the like.

In Japanese Patent Application Laid-Open No. 2015-72499, a lens unit consisting of a cemented lens of a positive lens and a negative lens is used for focusing. In the optical system described in Japanese Patent Application Laid-Open No. 2015-72499, a lens made of a material with a high specific gravity is used for the negative lens in the focus lens unit. Accordingly, the focus lens unit tends to have a heavy weight.

Meanwhile, the optical systems disclosed in Japanese Patent Application Laid-Open No. 2014-89351, Japanese Patent Application Laid-Open No. 2013-88718, and Japanese Patent Application Laid-Open No. 2013-182054 each perform focusing by using only a single lens. This method is advantageous for reductions in the size and weight of the focus lens unit. This method, however, causes a large variation in chromatic aberration in focusing, and accordingly it is difficult to achieve high optical properties over the entire range of object distance.

SUMMARY OF THE INVENTION

The present invention aims at providing an optical system which includes a small focus lens unit, causes only small aberration variations in focusing, and is capable of achieving high optical properties over the entire range of object distance.

An optical system of the present invention includes an aperture stop; and a focus lens unit arranged on an image side of the aperture stop, the focus lens unit having a negative refractive power and moving during focusing. The focus lens unit moves toward the image side during focusing from infinity to close distance. The focus lens unit includes a positive lens PL and a negative lens NL. The following conditional expressions are satisfied:

$23.0 < vdNL < 40.0$;

$2.44 < NdNL - 0.0003 \times vdNL^2 + 0.034 \times vdNL < 2.64$; and $vdPL < 23.0$, where vdNL denotes an Abbe number of a material of the negative lens NL, NdNL denotes a refractive index of the material of the negative lens NL at d-line, and vdPL denotes an Abbe number of a material of the positive lens PL. According to the present invention, it is possible to obtain an optical system that includes a small focus lens unit, causes only small aberration variations in focusing and is capable of achieving high optical properties over the entire range of object distance.

Further features of the present invention will become apparent from the following description of exemplary embodiments with reference to the attached drawings.

BRIEF DESCRIPTION OF THE DRAWINGS

FIG. 8A is a longitudinal aberration diagram of the optical system in Embodiment 4 at the wide angle end.

FIG. 8B is a longitudinal aberration diagram of the optical system in Embodiment 4 at the telephoto end.

DESCRIPTION OF THE EMBODIMENTS

Hereinafter, description will be provided for preferred embodiments of the present invention based on the accompanying drawings. An optical system includes an aperture stop, and a focus lens unit arranged on an image side of the aperture stop, the focus lens unit having a negative refractive power and moving during focusing. The focus lens unit moves toward the image side during focusing from infinity (infinite distance object) to close distance (close distance object). The focus lens unit includes a positive lens PL and a negative lens NL.

Figure 1:
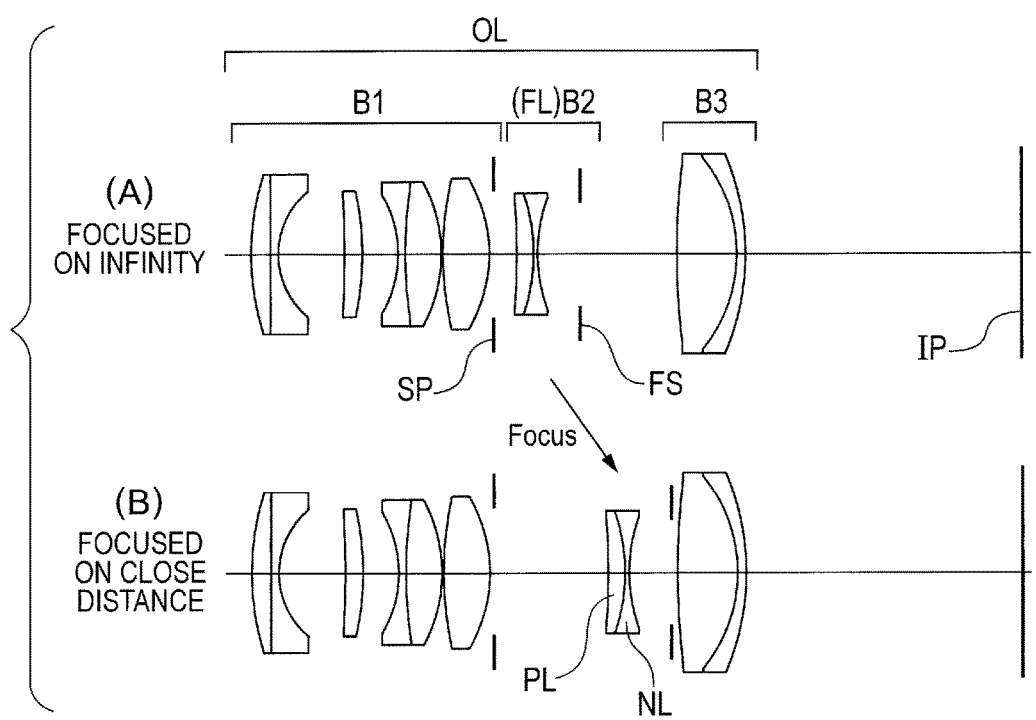
FIG. 1 includes lens cross sectional views of an optical system in Embodiment 1 focused on infinity and focused on close distance, respectively.
Figure 2A:
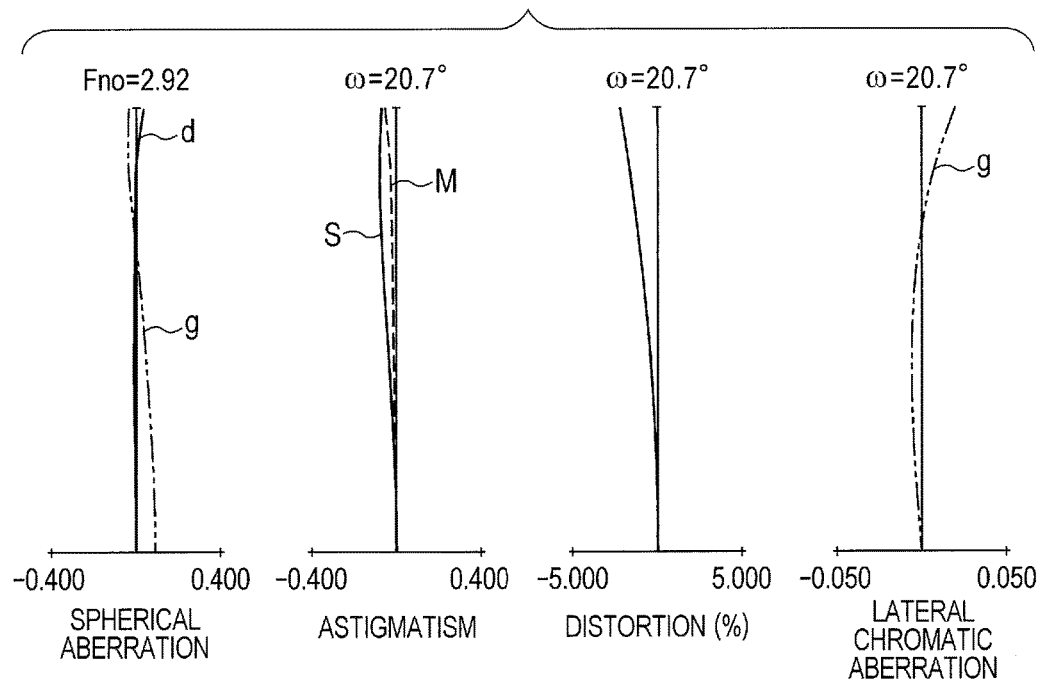
FIG. 2A is a longitudinal aberration diagram of the optical system in Embodiment 1 focused on infinity.
Figure 2B:
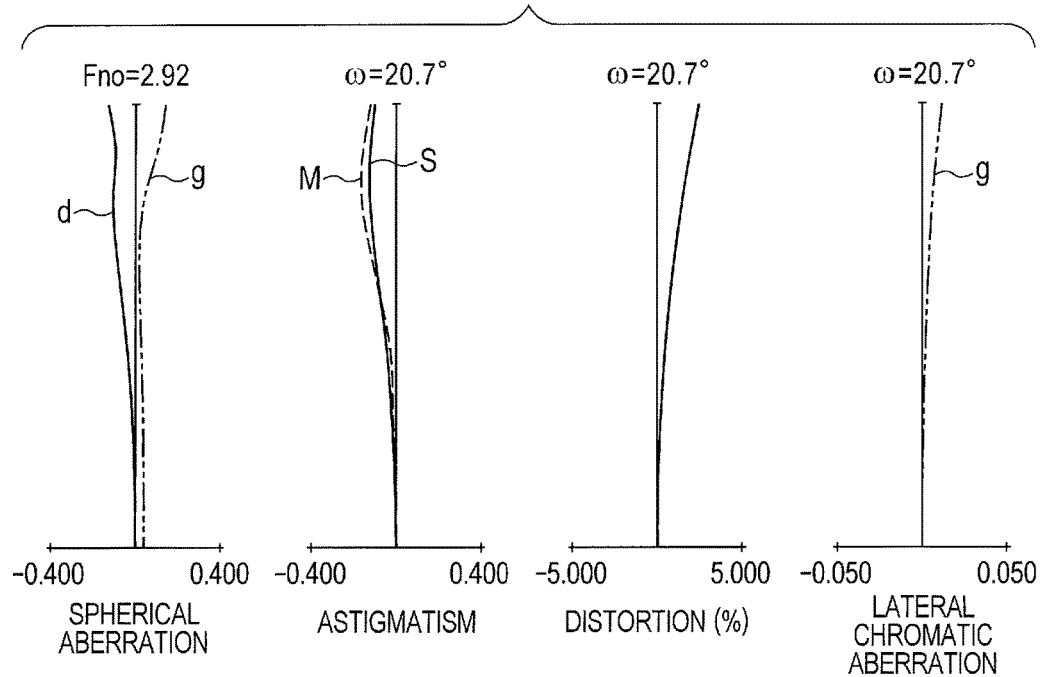
FIG. 2B is a longitudinal aberration diagram of the optical system in Embodiment 1 focused on close distance.

FIG. 1 includes lens cross sectional views of an optical system in Embodiment 1 focused on infinity (A) and focused on close distance (B). FIGS. 2A and 2B are longitudinal aberration diagrams of the optical system in Embodiment 1 focused on infinity and focused on close distance (magnification at ×1), respectively.

Figure 3:
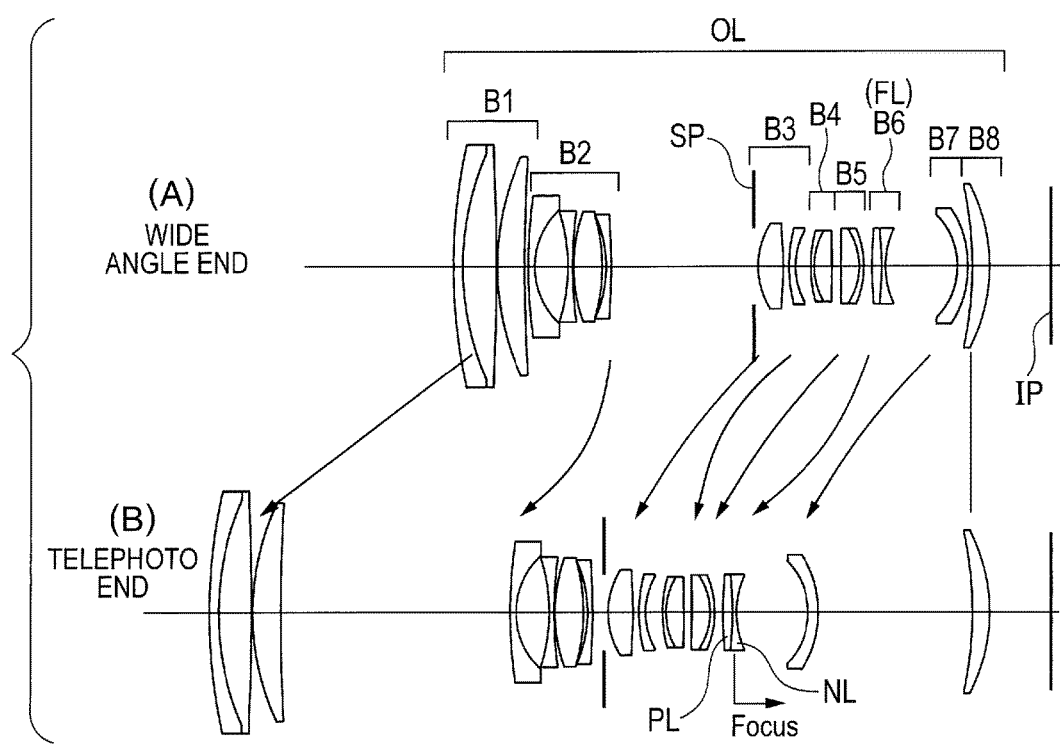
FIG. 3 includes lens cross sectional views of an optical system in Embodiment 2 at a wide angle end and at a telephoto end, respectively.
Figure 4A:
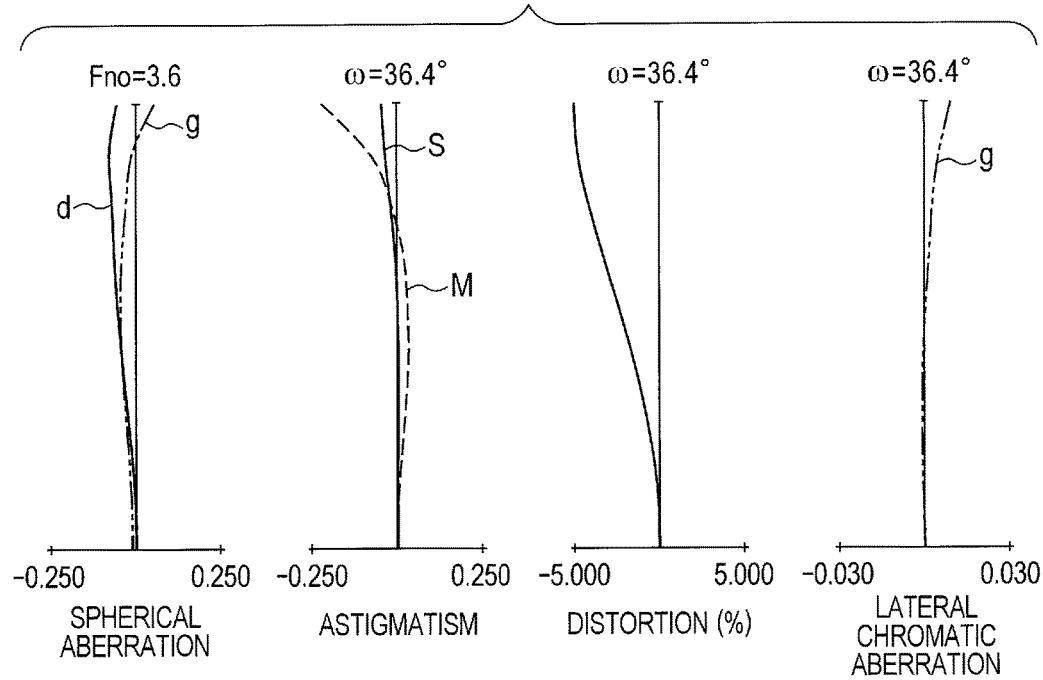
FIG. 4A is a longitudinal aberration diagram of the optical system in Embodiment 2 at the wide angle end.
Figure 4B:
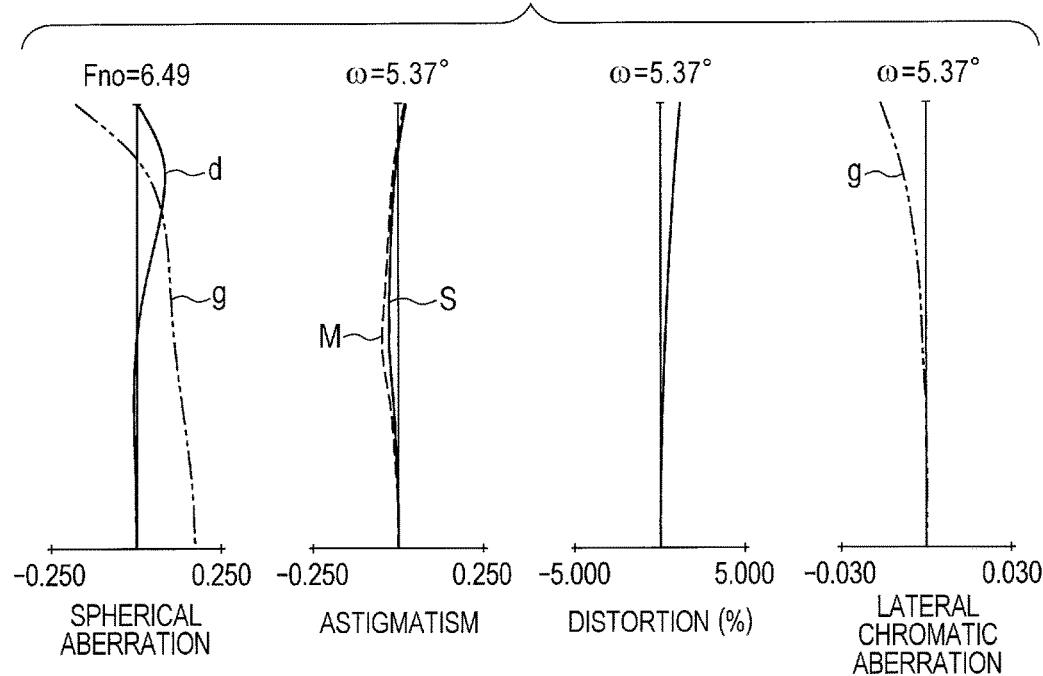
FIG. 4B is a longitudinal aberration diagram of the optical system in Embodiment 2 at the telephoto end.

FIG. 3 includes lens cross sectional views of an optical system in Embodiment 2 focused on infinity at a wide angle end (A) and at a telephoto end (B). FIGS. 4A and 4B are longitudinal aberration diagrams of the optical system focused on infinity at the wide angle end and at the telephoto end, respectively.

Figure 5:
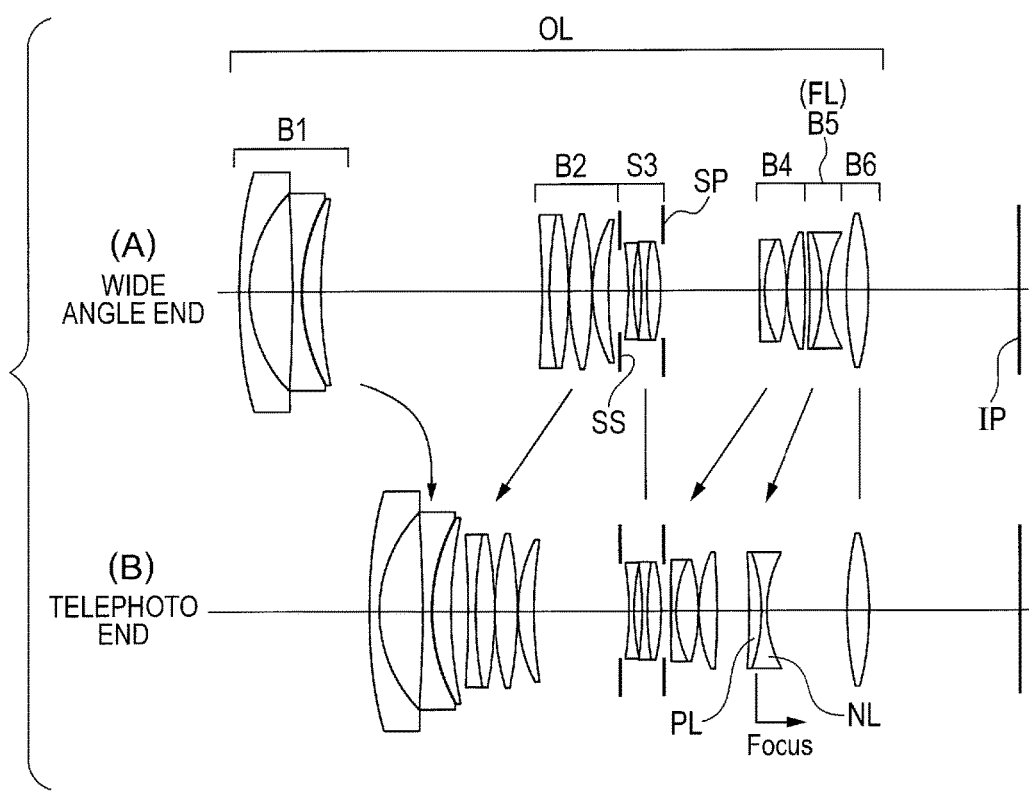
FIG. 5 includes lens cross sectional views of an optical system in Embodiment 3 at a wide angle end and at a telephoto end, respectively.
Figure 6A:
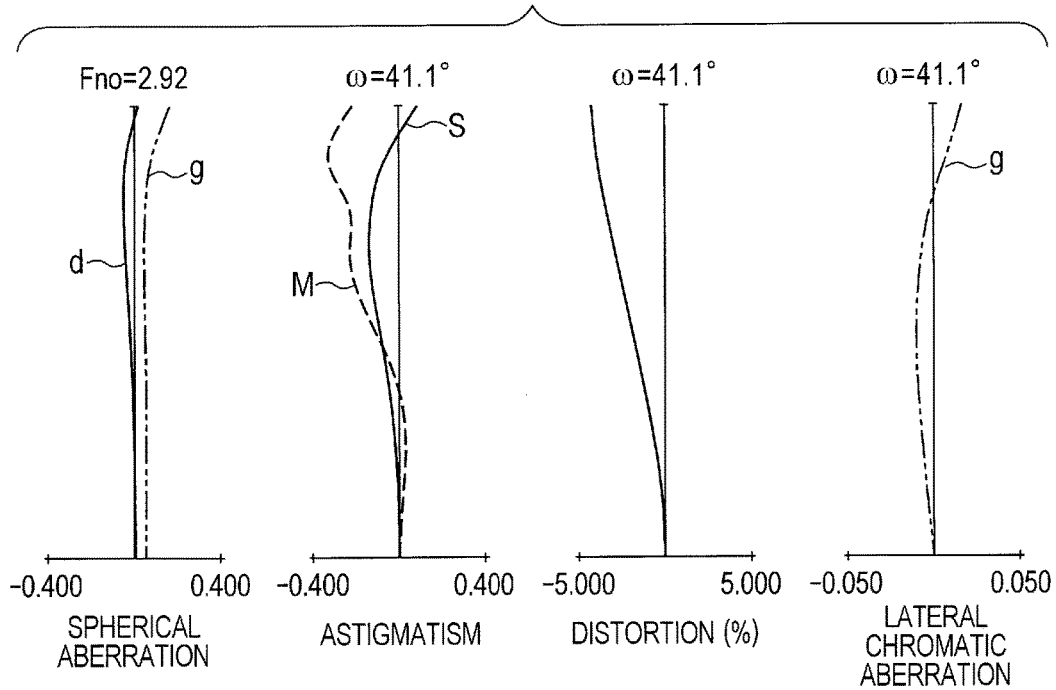
FIG. 6A is a longitudinal aberration diagram of the optical system in Embodiment 3 at the wide angle end.
Figure 6B:
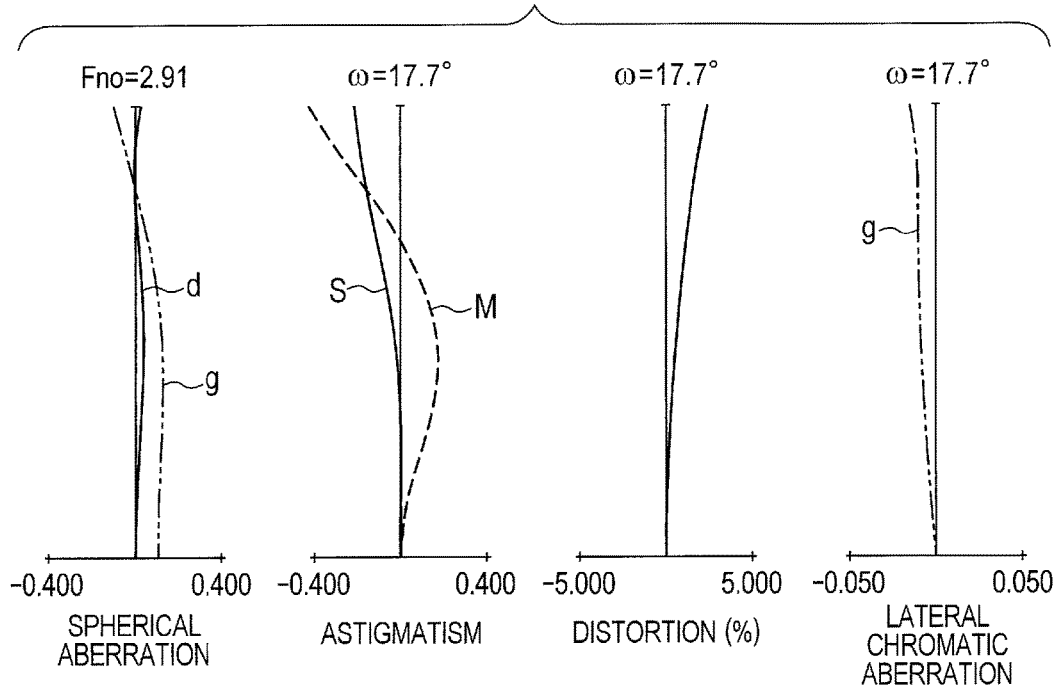
FIG. 6B is a longitudinal aberration diagram of the optical system in Embodiment 3 at the telephoto end.

FIG. 5 includes lens cross sectional views of an optical system in Embodiment 3 focused on infinity at a wide angle end (A) and at a telephoto end (B). FIGS. 6A and 6B are longitudinal aberration diagrams of the optical system focused on infinity at the wide angle end and at the telephoto end, respectively.

Figure 7:
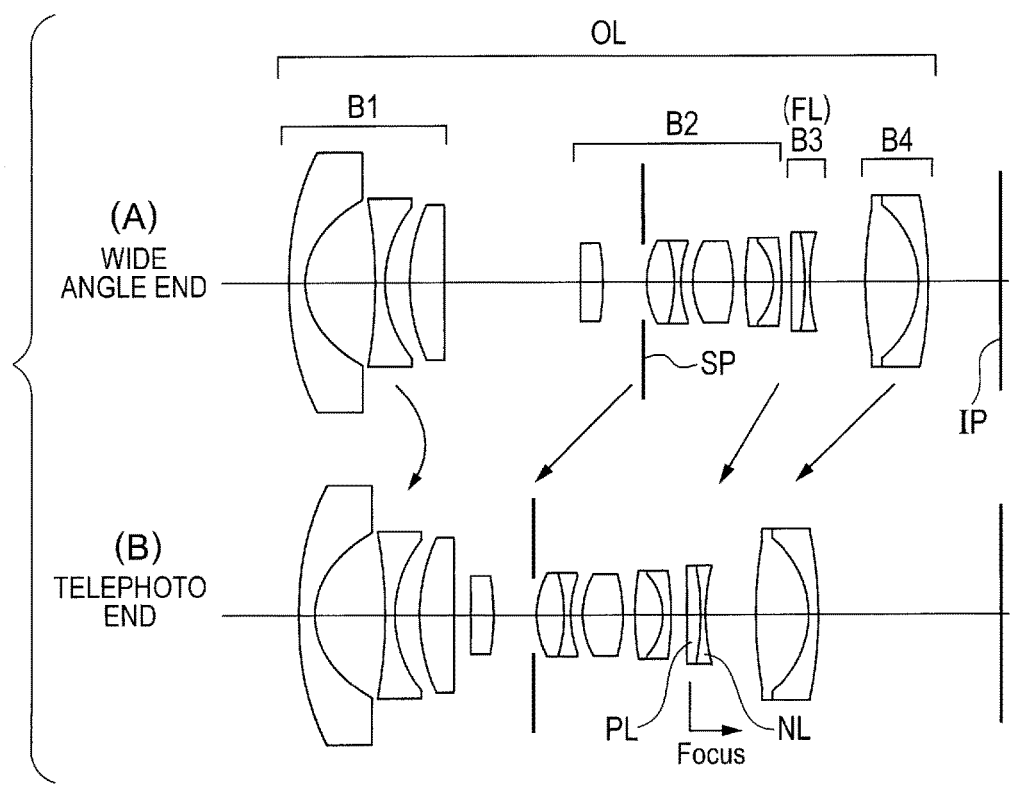
FIG. 7 includes lens cross sectional views of an optical system in Embodiment 4 at a wide angle end and at a telephoto end, respectively.

FIG. 7 includes lens cross sectional views of an optical system in Embodiment 4 focused on infinity at a wide angle end (A) and at a telephoto end (B). FIGS. 8A and 8B are longitudinal aberration diagrams of the optical system focused on infinity at the wide angle end and at the telephoto end, respectively.

Figure 9:
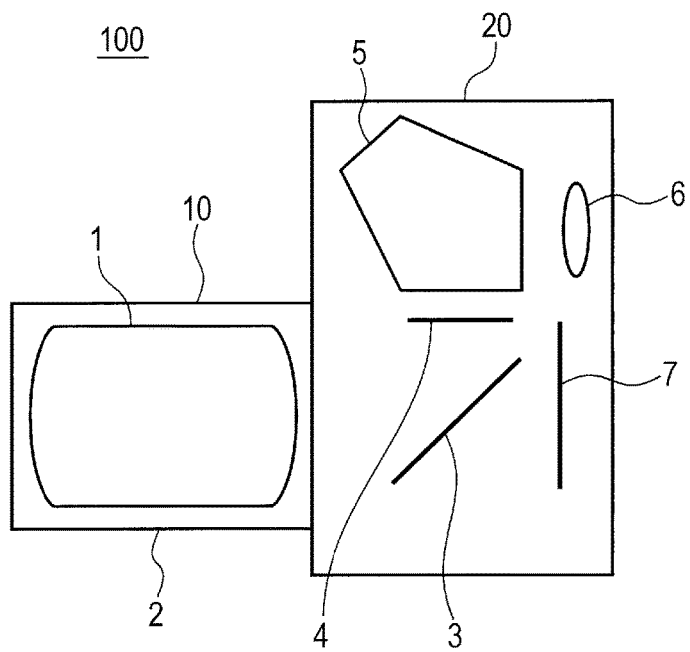
FIG. 9 is a schematic diagram of essential parts of an image pickup apparatus in an embodiment of the present invention.
Figure 10:
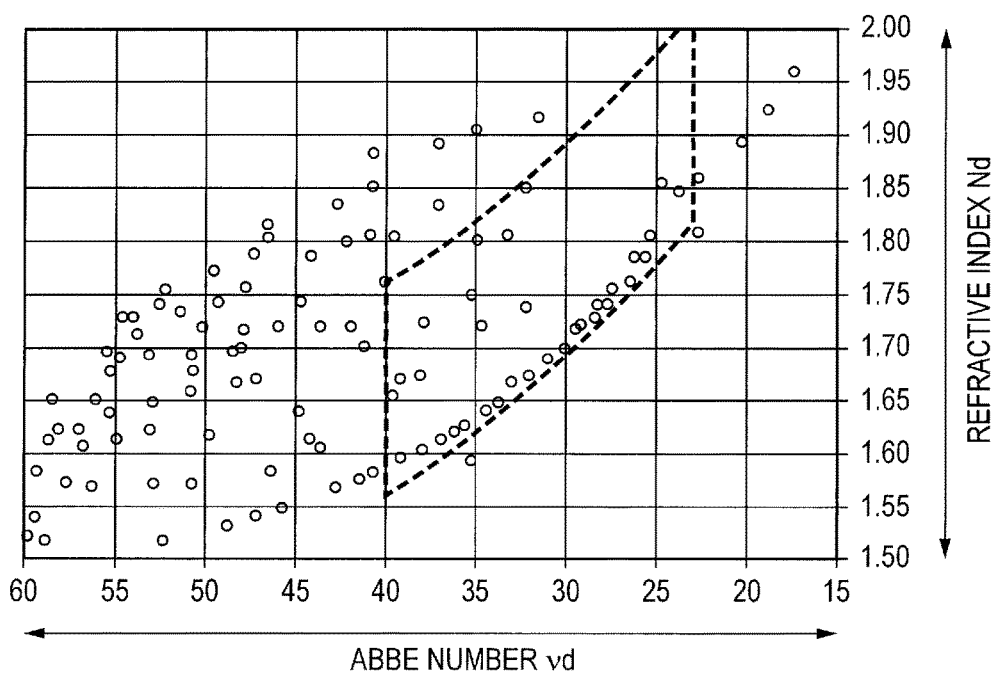
FIG. 10 is a diagram presenting a relationship between an Abbe number vd and a refractive index Nd of a general glass material.

FIG. 9 is a schematic diagram of an image pickup apparatus in an embodiment of the present invention. FIG. 10 is an explanatory diagram depicting a relationship between an Abbe number and a refractive index of an optical glass material.

The optical systems in Embodiments are image pickup optical systems for use with image pickup apparatuses such as video cameras, digital still cameras, and silver-halide film cameras. Note that the optical system in each of Embodiments may be used as a projection optical system for a projector. In each of the lens cross sectional views, the left side is the object side (front side) and the right side is the image side (rear side). OL is an optical system, and Bi indicates an ith lens unit, where i is an ordinal number of a lens unit counted from the object side.

SP is an aperture stop which determines (restricts) a bundle of rays at a minimum F-number (Fno). FS is a flare cut stop (fixed aperture). IP is an image plane. For use as an image pickup optical system for a video camera or a digital still camera, an image pickup surface of a solid-state image pickup element (photoelectric conversion element) such as a CCD sensor or a CMOS sensor is placed on the image plane. Meanwhile, for use as an image pickup optical system for a silver halide film camera, a photosensitive surface equivalent to a film surface is placed on the image plane. An arrow associated with Focus indicates a movement direction of the lens unit during focusing from infinity to close distance.

Here, the lens unit is referred to as a lens system that includes at least one lens and can be demarcated from other lens units or the like according to changes in lens distances in an optical axis direction along with zooming or focusing. In the spherical aberration diagrams, Fno is an F-number, a solid line d is d-line (at the wavelength of 587.6 nm), and a two-dot chain line g is g-line (at the wavelength of 435.8 nm). In the astigmatism diagrams, a dotted line M is a meridional image plane at the d-line, and a solid line S is a sagittal image plane at the d-line. In the distortion diagrams, the distortion at the d-line is presented. In the lateral chromatic aberration diagrams, the lateral chromatic aberration at the g-line is presented. Then, ω is a half angle of view (degrees).

The optical system OL of each of Embodiments includes an aperture stop SP and a focus lens unit FL arranged on the image side of the aperture stop SP, the focus lens unit having a negative refractive power and moving during focusing. The focus lens unit FL moves from the object side toward the image side during focusing from infinity to close distance. The focus lens unit FL includes a positive lens PL and a negative lens NL. The focus lens unit FL satisfies the following conditional expressions:

$$23.0 < vdNL < 40.0 \tag{1};$$

$$2.44 < NdNL - 0.0003 \times vdNL^2 + 0.034 \times vdNL < 2.64 \tag{2};$$

and $$vdPL < 23.0 \tag{3},$$

where vdNL denotes an Abbe number of a material of the negative lens NL, NdNL denotes a refractive index of the material of the negative lens NL at the d-line, and vdPL denotes an Abbe number of a material of the positive lens PL.

Here, Ng, NF, Nd, and NC denote refractive indices of a material at the wavelengths of the Fraunhofer g-line (435.8 nm), F-line (486.1 nm), d-line (587.6 nm), and C-line (656.3 nm), respectively. Then, an Abbe number νd of a material and a later-described partial dispersion ratio θgF of the material based on the g-line and the F-line are defined as:

$$\nu d=(Nd-1)/(NF-NC); \text{ and}$$

$$\theta gF=(Ng-NF)/(NF-NC).$$

Hereinafter, a chromatic aberration of the F-line from the C-line is referred to as a primary chromatic aberration, and a chromatic aberration of the g-line from the F-line is referred to as a secondary chromatic aberration.

The optical system OL performs both primary achromatism (primary chromatic aberration correction) and secondary achromatism (secondary chromatic aberration correction) appropriately by using materials each having an appropriate Abbe number νd and an appropriate partial dispersion ratio θgF, and thereby achieves good optical properties.

The optical system OL includes the aperture stop SP and the lens unit (focus lens unit) arranged on the image side of the aperture stop SP and moving during focusing. The aperture stop SP is a member which determines (restricts) a bundle of rays at the F-number (Fno), and adjusts a volume of light rays passing through the inside of the optical system OL by changing the aperture diameter with a mechanical mechanism or electrical mechanism. The focus lens unit FL moves on the optical axis depending on an object distance in order to focus on a subject (object). The arranging of the focus lens unit FL on the image side of the aperture stop SP is intended to reduce the size and weight of the focus lens unit FL.

In the optical system OL, the focus lens unit has a negative refractive power, and moves toward the image side during focusing from infinity (infinite distance object) to close distance (close distance object). In many cases, a bundle of rays passing through an optical system arranged on the image side of the aperture stop SP is converged, and the effective diameter of a lens unit arranged inside the lens system is accordingly small. Thus, when a lens unit arranged on the image side of the aperture stop SP is used for focusing, it is easier to reduce the size and weight of the focus lens unit FL.

The focus lens unit FL according to the present invention includes the positive lens PL and the negative lens NL. Including at least one positive lens PL and at least one negative lens NL, the focus lens unit FL is configured to reduce a variation in chromatic aberration in focusing. In addition, the focus lens unit FL satisfies the aforementioned conditional expressions (1) to (3).

Next, description will be provided for technical meanings of the aforementioned conditional expressions. The conditional expression (1) specifies a range of the Abbe number of the material of the negative lens NL, and the conditional expression (2) specifies a range of the refractive index of the material of the negative lens NL. FIG. 10 is a graph depicting a relationship between the Abbe number νd and the refractive index Nd of general optical glass material currently commercially available. In FIG. 10, the horizontal axis indicates the Abbe number νd, and the vertical axis indicates the refractive index Nd. Then, a region which satisfies the conditional expressions (1) and (2) is indicated by a broken line.

If the Abbe number of the material of the negative lens NL is smaller than the lower limit value of the conditional expression (1) (in other words, too high dispersion), the primary achromatism is difficult in the focus lens unit FL, so that it is difficult to suppress a variation in the chromatic aberration in focusing. Meanwhile, if the Abbe number of the material of the negative lens NL is greater than the upper limit value of the conditional expression (1) (in other words, too low dispersion), this configuration is advantageous for the primary achromatism but such a glass material with a low specific gravity is difficult to obtain, so that the weight reduction of the focus lens unit is difficult. Note that a material with a low specific gravity in the present invention means a material with a specific gravity of about 3.7 or below [g/cm$^3$], for example.

Here, the specific gravity of a material is defined as a ratio of a mass of a unit volume of a material used for a lens at a normal temperature (15° C. to 25° C.) to a mass of the equal volume of pure water at 4° C. under pressure of 101.325 kPa (standard pressure).

If the refractive index of the material of the negative lens NL is higher than the upper limit value of the conditional expression (2), the Petzval sum is so large that the curvature of field is difficult to suppress. On the other hand, if the refractive index of the material of the negative lens NL is lower than the lower limit value of the conditional expression (2), such a glass material is difficult to obtain from glass materials stably supplied by mass-production.

The conditional expression (3) specifies the Abbe number of the material of the positive lens PL. If the Abbe number of the material of the positive lens PL is greater than the upper limit value of the conditional expression (3) (in other words, too low dispersion), the primary achromatism is difficult in the focus lens unit FL, so that it is difficult to suppress a variation in the chromatic aberration in focusing. In this case, in order to reduce the variation in the chromatic aberration, the refractive powers of the positive lens PL and the negative lens NL have to be increased, and accordingly the volumes of the positive lens PL and the negative lens NL may be increased. This makes it difficult to reduce the size and weight of the focus lens unit FL.

When the focus lens unit FL satisfies all the conditional expressions (1) to (3), the focus lens unit FL can achieve high optical properties over the entire range of object distance, and moreover allows each reduction in the size and weight of the focus lens unit FL.

It is more preferred that Embodiments satisfy one or more of the following conditional expressions. Here, νd denotes the Abbe number of a material, θgF denotes a partial dispersion ratio of the material based on the g-line and the F-line, and θgFa denotes a standard partial dispersion ratio and is defined as:

$$\theta gFa=-1.665\times10^{-7}\times\nu d^3+5.213\times10^{-5}\times\nu d^2-5.656\times10^{-3}\times\nu d+0.7268 \quad (A).$$

Further, θgFNL denotes a partial dispersion ratio of the material of the negative lens NL based on the g-line and the F-line, θgFaNL denotes a standard partial dispersion ratio of the material of the negative lens NL, θgFPL denotes a partial dispersion ratio of the material of the positive lens PL based on the g-line and the F-line, θgFaPL denotes a standard partial dispersion ratio of the material of the positive lens PL, DNL denotes the specific gravity of the material of the negative lens NL, NdPL denotes the refractive index of the material of the negative lens NL at the d-line, DPL denotes the specific gravity of the material of the positive lens PL, R1NL denotes the radius of curvature of the object-side lens surface of the negative lens NL, and R2NL denotes the radius of curvature of the image-side lens surface of the negative lens NL.

Given the above definitions, it is preferred that the focus lens unit FL should satisfy one or more of the following conditional expressions:

$$\theta gFNL < \theta gFaNL \quad (4);$$

$$\theta gFaPL < \theta gFPL \quad (5);$$

$$DNL < -3.1 \times NdNL^2 + 14.7 \times NdNL - 12.5 \quad (6);$$

$$DPL < -3.1 \times NdPL^2 + 14.7 \times NdPL - 12.5 \quad (7);$$

$$1.80 < NdPL \quad (8);$$

$$DNL < 3.70 \quad (9);$$

$$DPL < 3.70 \quad (10);$$

$$1.2 < vdNL/vdPL < 2.2 \quad (11); \text{ and}$$

$$0.0 < (R1NL + R2NL)/(R1NL - R2NL) < 1.0 \quad (12).$$

Next, description will be provided for technical meanings of the aforementioned conditional expressions. The conditional expression (4) specifies the partial dispersion ratio of the material of the negative lens NL. The formula (A) defining the right side of the conditional expression (4) expresses a relationship between the Abbe number vd and the partial dispersion ratio θgF of a general optical glass material. If the partial dispersion ratio θgFNL of the material of the negative lens NL is higher than the upper limit value of the conditional expression (4), the secondary achromatism is insufficient and it is difficult to obtain high optical properties.

Similarly, the conditional expression (5) specifies the partial dispersion ratio θgFPL of the material of the positive lens PL. If the partial dispersion ratio θgFPL of the material of the positive lens PL is lower than the lower limit value of the conditional expression (5), the secondary achromatism is insufficient and it is difficult to obtain high optical properties. Hence, when the focus lens unit FL satisfies both the conditional expressions (4) and (5), it is easy to obtain an optical system having high optical properties.

The conditional expression (6) specifies a relationship between the specific gravity and the refractive index of the negative lens NL. The conditional expression (6) indicates a range where the weight reduction of the focus lens unit FL is easy to achieve. Generally speaking, in a case where negative lenses having the same center thickness are designed to have a negative refractive power with an equal value, use of a material with a higher refractive index results in a smaller edge thickness. In other words, the volume of the negative lens can be made small. Accordingly, the weight of the negative lens as a single lens can be reduced easily. On the other hand, a material with a high refractive index tends to have a high specific gravity (be heavy). Hence, it is important to set both of them appropriately.

If a material having a specific gravity higher than the upper limit value of the conditional expression (6) is used for the negative lens NL, the weight reduction of the focus lens unit FL is disadvantageously difficult. Similarly, the conditional expression (7) specifies a relationship between the specific gravity and the refractive index of the positive lens PL. In a case where positive lenses having the same edge thickness are designed to have a positive refractive power with an equal value, use of a material with a higher refractive index results in a smaller center thickness. Accordingly, the weight of the positive lens as a single lens can be reduced easily. On the other hand, a material with a high refractive index tends to have a high specific gravity (be heavy). Hence, it is important to set both of them appropriately.

If a material having a specific gravity higher than the upper limit value of the conditional expression (7) is used for the positive lens PL, the weight reduction of the focus lens unit FL is disadvantageously difficult. Hence, when the focus lens unit FL satisfies both the conditional expressions (6) and (7), it is easy to obtain an optical system having a lightweight focus lens unit FL.

The conditional expression (8) specifies the refractive index of the material of the positive lens PL. If the refractive index of the material of the positive lens PL is lower than the lower limit value of the conditional expression (8), the Petzval sum is so large that the curvature of field is difficult to suppress. Hence, when the focus lens unit FL satisfies the conditional expression (8), it is easy to obtain high optical properties.

The conditional expression (9) specifies the specific gravity of the material of the negative lens NL. If a material having a specific gravity greater than the upper limit value of the conditional expression (9) is used for the negative lens NL, the weight reduction of the focus lens unit FL is disadvantageously difficult. Similarly, the conditional expression (10) specifies the specific gravity of the material of the positive lens PL. If a material having a specific gravity higher than the upper limit value of the conditional expression (10) is used for the positive lens PL, the weight reduction of the focus lens unit FL is disadvantageously difficult. When the focus lens unit FL satisfies both the conditional expressions (9) and (10), it is easy to obtain an optical system having a lightweight focus lens unit FL.

The conditional expression (11) specifies a ratio of the Abbe number vdNL of the material of the negative lens NL to the Abbe number vdPL of the material of the positive lens PL. If the dispersion of a material of the negative lens NL is so low that the ratio exceeds the upper limit value of the conditional expression (11), this material is advantageous to correct the chromatic aberration. However, it is difficult to obtain such a material with a low specific gravity for the negative lens NL and accordingly it is difficult to reduce the weight of the focus lens unit FL.

On the other hand, if the dispersion of a material of the negative lens NL is so high that the ratio falls below the lower limit value of the conditional expression (11), it is difficult to suppress a variation in the chromatic aberration in focusing. Thus, when the focus lens unit FL satisfies the conditional expression (11), it is easy to obtain an optical system having a lightweight focus lens unit FL and achieving high optical properties.

The conditional expression (12) specifies the lens shape of the negative lens NL. If a value obtained from the lens shape falls below the lower limit value of the conditional expression (12), the curvature of the image-side lens surface of the negative lens NL takes a large positive value (a surface gently concave to the image side) or takes a negative value (a surface convex to the image side). In this case, an axial ray (Fno ray) incident on the image-side lens surface of the negative lens NL and the image-side lens surface are not concentric with each other, which causes a great variation in the spherical aberration in focusing and makes it difficult to obtain high optical properties over the entire range of object distance.

On the other hand, if the value obtained from the lens shape exceeds the upper limit value of the conditional expression (12), the negative lens NL has a meniscus shape having a concave surface facing the image side. In this case, the variation in the spherical aberration is small, but pupil paraxial rays are greatly diffused and over-corrected by the image-side lens surface, which causes the lateral chromatic aberration and the distortion to greatly vary in focusing. As a result, it is difficult to obtain an optical system having high optical properties over the entire range of object distance.

In addition, in the present invention, the focus lens unit preferably only consists of the positive lens PL and the negative lens NL. The configuration consisting of a single positive lens and a single negative lens makes it easy to reduce the weight of the focus lens unit while reducing the aberration variations in focusing.

Further, in the optical system, it is preferred to arrange a lens unit having a positive refractive power on the image side of the focus lens unit. When a lens unit having a positive refractive power is arranged on the image side of the focus lens unit, the effective diameter of the focus lens unit can be made small, and thus the weight reduction of the focus lens unit is easy to achieve.

As described above, an optical system having a small and lightweight focus lens unit and achieving high optical properties over the entire range of object distance can be obtained according to the present invention. More preferably, the numerical value ranges of the conditional expressions (1) to (12) may be set as follows:

$$24.0 < vdNL < 39.0 \quad (1a);$$

$$2.47 < NdNL - 0.0003 \times vdNL^2 + 0.034 \times vdNL < 2.63 \quad (2a);$$

$$vdPL < 22.90 \quad (3a);$$

$$\theta gFNL < \theta gFaNL - 0.0005 \quad (4a);$$

$$\theta gFaPL + 0.001 < \theta gFPL \quad (5a);$$

$$DNL < -3.1 \times NdNL^2 + 14.7 \times NdNL - 12.6 \quad (6a);$$

$$DPL < -3.1 \times NdPL^2 + 14.7 \times NdPL - 12.6 \quad (7a);$$

$$1.82 < NdPL \quad (8a);$$

$$DNL < 3.60 \quad (9a);$$

$$DPL < 3.65 \quad (10a);$$

$$1.3 < vdNL/vdPL < 2.1 \quad (11a); \text{ and}$$

$$0.03 < (R1NL + R2NL)/(R1NL - R2NL) < 0.80 \quad (12a).$$

Even more preferably, the numerical value ranges of the conditional expressions (1a) to (12a) may be set as follows:

$$30.0 < vdNL < 36.0 \quad (1b);$$

$$2.50 < NdNL - 0.0003 \times vdNL^2 + 0.034 \times vdNL < 2.62 \quad (2b);$$

$$vdPL < 22.80 \quad (3b);$$

$$\theta gFNL < \theta gFaNL - 0.001 \quad (4b);$$

$$\theta gFaPL + 0.002 < \theta gFPL \quad (5b);$$

$$DNL < -3.1 \times NdNL^2 + 14.7 \times NdNL - 12.7 \quad (6b);$$

$$DPL < -3.1 \times NdPL^2 + 14.7 \times NdPL - 12.7 \quad (7b);$$

$$1.84 < NdPL \quad (8b);$$

$$DNL < 3.50 \quad (9b);$$

$$DPL < 3.63 \quad (10b);$$

$$1.4 < vdNL/vdPL < 2.0 \quad (11b); \text{ and}$$

$$0.05 < (R1NL + R2NL)/(R1NL - R2NL) < 0.70 \quad (12b).$$

Next, the lens configuration of the optical system OL of each of Embodiments will be described. The optical lens system OL in Embodiment 1 illustrated in FIG. 1 consists, in order from the object side to the image side, of a first lens unit B1 having a positive refractive power, an aperture stop SP, a second lens unit B2 having a negative refractive power, and a third lens unit B3 having a positive refractive power. During focusing from infinity to close distance, the second lens unit B2 moves from the object side toward the image side as indicated by the arrow Focus. The second lens unit B2 is a focus lens unit. The second lens unit B2 consists, in order from the object side to the image side of two lenses, that is, a positive lens PL and a negative lens NL arranged.

The optical system in Embodiment 1 is a macro lens capable of focusing on at a reproduction ratio from ×0 (i.e., infinity) to ×1.

The optical system OL of Embodiment 2 illustrated in FIG. 3 is a zoom lens. The optical system OL of Embodiment 2 consists, in order from the object side to the image side, of a first lens unit B1 having a positive refractive power, a second lens unit B2 having a negative refractive power, an aperture stop SP, a third lens unit B3 having a positive refractive power, a fourth lens unit B4 having a positive refractive power, a fifth lens unit B5 having a positive refractive power, a sixth lens unit B6 having a negative refractive power, a seventh lens unit B7 having a negative refractive power, and an eighth lens unit B8 having a positive refractive power.

For zooming from the wide angle end to the telephoto end, as indicated by the respective arrows, the first lens unit B1 moves toward the object side and the second lens unit B2 moves toward the object side along a locus convex to the image side. The third lens unit B3, the fifth lens unit B5, and the seventh lens unit B7 move toward the object side in a unified manner (along the same loci). The fourth lens unit B4 moves toward the object side, and the sixth lens unit B6 moves toward the object side. The eighth lens unit B8 does not move for zooming.

During zooming from the wide angle end to the telephoto end, a distance between the first lens unit B1 and the second lens unit B2 is widened and a distance between the second lens unit B2 and the third lens unit B3 is narrowed. In addition, a distance between the third lens unit B3 and the fourth lens unit B4 is narrowed once and then widened, and a distance between the fourth lens unit B4 and the fifth lens unit B5 is widened once and then narrowed. Moreover, a distance between the fifth lens unit B5 and the sixth lens unit B6 is widened once and then narrowed, a distance between the sixth lens unit B6 and the seventh lens unit B7 is narrowed once and then widened, a distance between the seventh lens unit B7 and the eighth lens unit B8 is widened.

Meanwhile, during focusing from infinity to close distance, the sixth lens unit B6 moves from the object side toward the image side as indicated by the arrow Focus. The sixth lens unit B6 is a focus lens unit. The sixth lens unit B6 consists, in order from the object side to the image side, of two lenses, that is, a positive lens PL and a negative lens NL.

The optical system OL of Embodiment 3 illustrated in FIG. 5 is a zoom lens. The optical system OL of Embodiment 3 consists, in order from the object side to the image side, of a first lens unit B1 having a negative refractive power, a second lens unit B2 having a positive refractive power, a third lens unit B3 having a negative refractive power, an aperture stop SP, a fourth lens unit B4 having a positive refractive power, a fifth lens unit B5 having a negative refractive power, and a sixth lens unit B6 having a positive refractive power.

For zooming from the wide angle end to the telephoto end, the first lens unit B1 moves toward the image side, the second lens unit B2 moves toward the object side, the fourth lens unit B4 moves toward the object side, and the fifth lens unit B5 moves toward the object side. The third lens unit B3 and the sixth lens unit B6 do not move for zooming. At the telephoto end as compared with the wide end, a distance between the first lens unit B1 and the second lens unit B2 is narrowed, a distance between the second lens unit B2 and the third lens unit B3 is widened, a distance between the third lens unit B3 and the fourth lens unit B4 is narrowed, a distance between the fourth lens unit B4 and the fifth lens unit B5 is widened, and a distance between the fifth lens unit B5 and the sixth lens unit B6 is widened.

Meanwhile, during focusing from infinity to close distance, the fifth lens unit B5 moves from the object side toward the image side as indicated by the arrow Focus. The fifth lens unit B5 is a focus lens unit. The fifth lens unit B5 consists, in order from the object side to the image side, of two lenses, that is, a positive lens PL and a negative lens NL arranged.

The optical system OL of Embodiment 4 illustrated in FIG. 7 is a zoom lens. The optical system OL of Embodiment 4 consists, in order from the object side to the image side, of a first lens unit B1 having a negative refractive power, a second lens unit B2 having a positive refractive power, a third lens unit B3 having a negative refractive power, and a fourth lens unit B4 having a positive refractive power. An aperture stop SP is arranged inside the second lens unit B2.

For zooming from the wide angle end to the telephoto end, the first lens unit B1 moves toward the object side along a locus convex to the image side, the second lens unit B2 moves toward the object side in a manner unified with the aperture stop SP, the third lens unit B3 moves toward the object side, and the fourth lens unit B4 moves toward the object side. At the telephoto end as compared with the wide angle end, a distance between the first lens unit B1 and the second lens unit B2 is narrowed, a distance between the second lens unit B2 and the third lens unit B3 is widened, and a distance between the third lens unit B3 and the fourth lens unit B4 is narrowed.

Meanwhile, during focusing from infinity to close distance, the third lens unit B3 moves from the object side toward the image side as indicated by the arrow Focus. The third lens unit B3 is a focus lens unit. The third lens unit B3 consists, in order from the object side to the image side, of two lenses, that is, a positive lens PL and a negative lens NL.

Next, an image pickup apparatus (single-lens reflex camera) 100 as an embodiment of a lens apparatus will be described with reference to FIG. 9. In FIG. 9, a lens apparatus 10 includes an optical system 1 in any of Embodiments 1 to 4.

The optical system 1 is held by a lens barrel 2 that is a holding member. A camera main body 20 includes a quick return mirror 3, a focusing plate 4, a roof pentaprism 5, an ocular lens 6, and so on. The quick return mirror 3 reflects light rays from the optical system 1 upward. The focusing plate 4 is arranged at a position where the optical system 1 forms an image. The roof pentaprism 5 converts a reverse image formed on the focusing plate 4 to an elected image. An observer observes the elected image through the ocular lens 6. A solid-state image pickup element (photoelectric conversion element) 7 is incorporated in the camera main body 20, and receives a subject light image formed by the image pickup optical system 1. Specifically, the solid-state image pickup element 7 is a CCD sensor, a CMOS sensor, or the like.

Hereinabove, the preferred embodiments of the present invention have been described, but the present invention is not limited to these embodiments, and may be modified or altered in various ways without departing from the spirit of the present invention. For example, any of the optical systems in the embodiments described above does not include a vibration reduction lens unit for image blurring correction, but may include a vibration reduction lens unit in any of the lens units. Also, the optical lens unit may include not only spherical lenses but also an aspheric lens. Further, the optical lens unit may include a diffractive optical element in addition to the dioptric elements (generally termed as lenses).

Hereinafter, numerical value data according to Embodiments 1 to 4 will be presented. In Embodiments 1 to 4, i denotes the ordinal number counted from the object side, ri denotes the radius of curvature of the ith optical surface (the ith surface), and di denotes an on-axis distance between the ith surface and the (i+1)th surface. In addition, ndi and vdi denote a refractive index and an Abbe number, respectively, of an optical medium located between the ith and (i+1)th surfaces at the wavelength of the d-line. An aspherical shape is expressed by the following formula:

$$X = \frac{H^2/R}{1+\sqrt{1-(1+K)(H/R)^2}} + A4H^4 + A6H^6 + A8H^8 + A10H^{10} + A12H^{12},$$

where an x axis is set in an optical axis direction, an H axis is set in a direction perpendicular to the optical axis, R denotes a paraxial radius of curvature where the radius on a light proceeding side is expressed with a positive sign, K denotes a conic constant, and A4, A6, A8, A10 and A12 denote aspheric coefficients.

Then, * added as a suffix to a surface number indicates an aspheric surface. In addition, "e-x" indicates $\times 10^{-x}$. BF is a backfocus expressed by a length in air. The lens total length is a value of a sum of the distance from the first lens surface to the last lens surface and the backfocus BF. Table 1 presents properties of glass materials used for the positive lens PL and the negative lens NL (material name, manufacturer, specific gravity, and so on). Moreover, Table 2 presents relationships between the aforementioned conditional expressions and the numerical value data in Embodiments 1 to 4.

[Numerical Value Data 1]

| Surface data ||||||
|---|---|---|---|---|---|
| Surface number | r | d | nd | vd | Effective diameter |
| 1 | 34.165 | 2.48 | 1.85478 | 24.8 | 19.45 |
| 2 | 3300.513 | 1.00 | 1.48749 | 70.2 | 18.70 |
| 3 | 10.582 | 8.49 | | | 15.04 |
| 4 | −125.841 | 2.25 | 1.80400 | 46.6 | 14.70 |
| 5 | −37.952 | 4.58 | | | 15.10 |
| 6 | −15.269 | 0.90 | 1.85478 | 24.8 | 14.45 |
| 7 | 59.190 | 4.63 | 1.78590 | 44.2 | 16.22 |
| 8 | −19.645 | 0.18 | | | 17.39 |
| 9* | 40.662 | 5.98 | 1.58313 | 59.4 | 18.25 |
| 10* | −17.849 | 0.50 | | | 18.30 |
| 11 (stop) | ∞ | (variable) | | | 16.49 |
| 12 | −98.208 | 2.15 | 1.95906 | 17.5 | 14.71 Positive lens PL |
| 13 | −23.966 | 0.50 | 1.80610 | 33.3 | 14.40 Negative lens NL |
| 14 | 21.148 | 5.43 | | | 13.54 |
| 15 | ∞ | (variable) | | | 13.42 |
| 16 | 99.857 | 7.67 | 1.62299 | 58.2 | 22.56 |

-continued

| | | | | | |
|---|---|---|---|---|---|
| 17 | −19.603 | 1.10 | 1.67270 | 32.1 | 23.57 |
| 18 | −33.023 | 35.46 | | | 24.53 |
| Image plane | ∞ | | | | |

Aspheric surface data

9th surface

K = 0.00000e+000
A4 = −9.11209e−006
A6 = −7.29675e−008
A8 = 6.77260e−010

10th surface

K = 0.00000e+000
A4 = 2.71641e−005
A6 = −5.37377e−008
A8 = 7.10081e−010

Various data

| | |
|---|---|
| Focal length | 36.10 |
| F-number | 2.92 |
| Half angle of view (deg) | 20.73 |
| Image height | 13.66 |
| Total lens length | 98.76 |
| BF | 35.46 |

Distances between lens units

| Magnification (times) | −0.00 | −0.50 | −1.00 |
|---|---|---|---|
| d11 | 3.08 | 8.77 | 14.68 |
| d15 | 12.37 | 6.68 | 0.77 |

Lens unit data

| Unit | Start surface | Focal length |
|---|---|---|
| 1 | 1 | 20.03 |
| 2 | 12 | −23.88 |
| 3 | 16 | 42.56 |

Single lens data

| Lens | Start surface | Focal length |
|---|---|---|
| 1 | 1 | 40.37 |
| 2 | 2 | −21.78 |
| 3 | 4 | 66.83 |
| 4 | 6 | −14.12 |
| 5 | 7 | 19.27 |
| 6 | 9 | 22.10 |
| 7 | 12 | 32.59 |
| 8 | 13 | −13.87 |
| 9 | 16 | 26.97 |
| 10 | 17 | −74.15 |

[Numerical Value Data 2]

Surface data

| Surface number | r | d | nd | vd | Effective diameter | |
|---|---|---|---|---|---|---|
| 1 | 98.040 | 1.60 | 1.91082 | 35.3 | 40.78 | |
| 2 | 49.070 | 5.79 | 1.49700 | 81.5 | 38.00 | |
| 3 | −423.769 | 0.15 | | | 37.77 | |
| 4 | 45.509 | 4.82 | 1.59522 | 67.7 | 36.59 | |
| 5 | 332.437 | (variable) | | | 35.87 | |
| 6 | 86.952 | 1.10 | 1.95375 | 32.3 | 23.34 | |
| 7 | 13.484 | 5.75 | | | 18.51 | |
| 8 | −31.460 | 0.80 | 1.77250 | 49.6 | 17.99 | |
| 9 | 70.614 | 0.15 | | | 17.75 | |
| 10 | 28.240 | 4.95 | 1.84666 | 23.9 | 17.78 | |
| 11 | −32.556 | 0.70 | | | 17.12 | |
| 12 | −21.847 | 0.85 | 1.69680 | 55.5 | 16.95 | |
| 13 | −120.000 | (variable) | | | 16.49 | |
| 14 (stop) | ∞ | 0.70 | | | 13.12 | |
| 15* | 13.204 | 4.34 | 1.58313 | 59.4 | 13.74 | |
| 16* | −61.870 | 0.99 | | | 13.16 | |
| 17 | 25.887 | 1.13 | 1.83481 | 42.7 | 12.21 | |
| 18 | 12.752 | (variable) | | | 11.37 | |
| 19 | 23.617 | 0.60 | 1.90366 | 31.3 | 11.20 | |
| 20 | 12.334 | 3.07 | 1.69680 | 55.5 | 10.90 | |
| 21 | −186.310 | (variable) | | | 10.64 | |
| 22 | −407.535 | 3.18 | 1.51633 | 64.1 | 11.05 | |
| 23 | −11.485 | 0.79 | 2.00069 | 25.5 | 11.40 | |
| 24 | −16.338 | (variable) | | | 11.89 | |
| 25 | 69.672 | 1.63 | 1.89286 | 20.4 | 12.10 | Positive lens PL |
| 26 | −69.673 | 0.70 | 1.74951 | 35.3 | 12.05 | Negative lens NL |
| 27 | 15.570 | (variable) | | | 11.92 | |
| 28* | −13.580 | 1.80 | 1.53160 | 55.8 | 16.54 | |
| 29* | −20.993 | (variable) | | | 18.70 | |
| 30 | −66.048 | 2.96 | 1.76200 | 40.1 | 26.44 | |
| 31 | −31.014 | 10.65 | | | 27.00 | |
| Image plane | ∞ | | | | | |

Aspheric surface data

15th surface

K = 0.00000e+000
A4 = −3.70870e−005
A6 = −9.06300e−008
A8 = 1.50901e−009
A10 = 8.60362e−012

16th surface

K = 0.00000e+000
A4 = 4.21568e−005
A6 = −3.28652e−008
A8 = 2.46762e−009
A10 = 5.11535e−012

28th surface

K = 0.00000e+000
A4 = −4.90424e−005
A6 = −2.47272e−007
A8 = 3.25583e−009

29th surface

K = 0.00000e+000
A4 = −4.47195e−005
A6 = −1.49024e−007
A8 = 2.93480e−009
A10 = −9.51658e−012

Various data

| Zoom ratio | | 7.83 | |
|---|---|---|---|
| | Wide angle | Middle | Telephoto |
| Focal length | 18.56 | 48.87 | 145.41 |
| F-NUMBER | 3.60 | 5.56 | 6.49 |
| Half angle of view (deg) | 36.35 | 15.62 | 5.37 |
| Image height | 13.66 | 13.66 | 13.66 |
| Total lens length | 103.26 | 118.62 | 145.33 |
| BF | 10.65 | 10.65 | 10.65 |
| d5 | 0.60 | 15.03 | 39.50 |
| d13 | 24.58 | 9.87 | 1.94 |
| d18 | 2.75 | 2.30 | 2.95 |
| d21 | 1.54 | 1.99 | 1.34 |
| d24 | 1.40 | 3.27 | 1.40 |
| d27 | 12.39 | 10.52 | 12.39 |
| d29 | 0.80 | 16.44 | 26.62 |

-continued

| Lens unit data |||
| --- | --- | --- |
| Lens | Start surface | Focal length |
| 1 | 1 | 75.07 |
| 2 | 6 | −15.20 |
| 3 | 14 | 35.51 |
| 4 | 19 | 39.62 |
| 5 | 22 | 52.89 |
| 6 | 25 | −30.80 |
| 7 | 28 | −79.01 |
| 8 | 30 | 74.03 |

| Single lens data |||
| --- | --- | --- |
| Lens | Start surface | Focal length |
| 1 | 1 | −109.57 |
| 2 | 2 | 88.85 |
| 3 | 4 | 88.03 |
| 4 | 6 | −16.86 |
| 5 | 8 | −28.08 |
| 6 | 10 | 18.55 |
| 7 | 12 | −38.47 |
| 8 | 15 | 19.07 |
| 9 | 17 | −31.33 |
| 10 | 19 | −29.31 |
| 11 | 20 | 16.71 |
| 12 | 22 | 22.83 |
| 13 | 23 | −42.04 |
| 14 | 25 | 39.23 |
| 15 | 26 | −16.92 |
| 16 | 28 | −79.01 |
| 17 | 30 | 74.03 |

[Numerical Value Data 3]

| Surface data ||||||
| --- | --- | --- | --- | --- | --- |
| Surface number | r | d | nd | vd | Effective diameter |
| 1* | 165.083 | 2.50 | 1.76385 | 48.5 | 60.02 |
| 2 | 36.605 | 11.05 | | | 49.76 |
| 3 | −384.870 | 2.30 | 1.77250 | 49.6 | 49.38 |
| 4 | 50.205 | 0.15 | | | 46.34 |
| 5 | 49.911 | 4.73 | 1.85478 | 24.8 | 46.37 |
| 6 | 114.280 | (variable) | | | 45.86 |
| 7 | −289.456 | 1.90 | 1.80518 | 25.4 | 36.71 |
| 8 | 113.450 | 4.83 | 1.77250 | 49.6 | 37.52 |
| 9 | −110.509 | 0.15 | | | 37.87 |
| 10 | 71.470 | 5.79 | 1.62299 | 58.2 | 38.35 |
| 11 | −104.366 | 0.15 | | | 38.14 |
| 12 | 40.408 | 4.08 | 1.69680 | 55.5 | 35.22 |
| 13 | 117.279 | (variable) | | | 34.44 |
| 14 | ∞ | 2.20 | | | 24.12 |
| 15* | −85.144 | 1.30 | 1.88300 | 40.8 | 23.41 |
| 16 | 56.965 | 2.08 | | | 22.99 |
| 17 | −85.145 | 1.30 | 1.83481 | 42.7 | 23.01 |
| 18 | 81.183 | 3.56 | 1.80518 | 25.4 | 23.56 |
| 19 | −55.401 | 0.70 | | | 23.84 |
| 20 (stop) | ∞ | (variable) | | | 23.85 |
| 21 | 1217.305 | 1.30 | 1.84666 | 23.9 | 23.86 |
| 22 | 30.036 | 5.67 | 1.49700 | 81.5 | 23.83 |
| 23 | −48.710 | 0.15 | | | 24.83 |
| 24 | 38.193 | 4.64 | 1.76385 | 48.5 | 28.33 |
| 25 | −197.504 | (variable) | | | 28.38 |
| 26 | −217.481 | 3.12 | 1.95906 | 17.5 | 28.33 Positive lens PL |
| 27 | −46.129 | 1.34 | 1.73800 | 32.3 | 28.38 Negative lens NL |
| 28 | 31.367 | (variable) | | | 28.13 |
| 29 | 88.514 | 5.73 | 1.58313 | 59.4 | 37.49 |
| 30* | −81.954 | 38.37 | | | 37.87 |
| Image plane | ∞ | | | | |

-continued

| Aspheric surface data |
| --- |
| 1st surface |
| K = 0.00000e+000 |
| A4 = 9.82513e−007 |
| A6 = 7.25887e−010 |
| A8 = −1.78147e−012 |
| A10 = 1.58760e−015 |
| A12 = −5.28187e−019 |
| 15th surface |
| K = 0.00000e+000 |
| A4 = 8.47133e−007 |
| A6 = 2.51390e−009 |
| A8 = −1.93121e−011 |
| A10 = 3.46857e−014 |
| 30th surface |
| K = 0.00000e+000 |
| A4 = 1.30471e−007 |
| A6 = −4.75408e−009 |
| A8 = 1.65473e−011 |
| A10 = −3.38681e−014 |
| A12 = 3.09924e−017 |

| Various data ||||
| --- | --- | --- | --- |
| Zoom ratio | | 2.75 | |
| | Wide angle | Middle | Telephoto |
| Focal length | 24.76 | 30.10 | 67.98 |
| F-NUMBER | 2.92 | 2.92 | 2.91 |
| Half angle of view (deg) | 41.15 | 35.71 | 17.65 |
| Image height | 21.64 | 21.64 | 21.64 |
| Total lens length | 198.84 | 183.00 | 165.88 |
| BF | 38.37 | 38.37 | 38.37 |
| d6 | 56.40 | 38.56 | 4.37 |
| d13 | 2.85 | 4.85 | 21.92 |
| d20 | 24.49 | 23.52 | 1.78 |
| d25 | 1.20 | 3.55 | 8.19 |
| d28 | 4.80 | 3.42 | 20.52 |

| Lens unit data |||
| --- | --- | --- |
| Lens | Start surface | Focal length |
| 1 | 1 | −39.10 |
| 2 | 7 | 33.39 |
| 3 | 14 | −50.17 |
| 4 | 21 | 41.12 |
| 5 | 26 | −42.97 |
| 6 | 29 | 73.89 |

| Single lens data |||
| --- | --- | --- |
| Lens | Start surface | Focal length |
| 1 | 1 | −62.10 |
| 2 | 3 | −57.36 |
| 3 | 5 | 100.27 |
| 4 | 7 | −101.01 |
| 5 | 8 | 73.15 |
| 6 | 10 | 68.96 |
| 7 | 12 | 86.59 |
| 8 | 15 | −38.49 |
| 9 | 17 | −49.61 |
| 10 | 18 | 41.38 |
| 11 | 21 | −36.39 |
| 12 | 22 | 38.30 |
| 13 | 24 | 42.26 |
| 14 | 26 | 60.51 |
| 15 | 27 | −25.11 |
| 16 | 29 | 73.89 |

[Numerical Value Data 4]

Surface data

| Surface number | r | d | nd | vd | Effective diameter | |
|---|---|---|---|---|---|---|
| 1* | 55.324 | 2.00 | 1.58313 | 59.4 | 31.13 | |
| 2* | 9.525 | 8.69 | | | 20.65 | |
| 3 | −59.000 | 1.20 | 1.72916 | 54.7 | 19.72 | |
| 4 | 15.000 | 3.05 | | | 17.59 | |
| 5 | 23.000 | 4.30 | 1.91082 | 35.3 | 18.16 | |
| 6 | ∞ | (variable) | | | 17.51 | |
| 7 | −600.000 | 2.80 | 1.48749 | 70.2 | 8.69 | |
| 8 | −30.000 | 5.01 | | | 9.00 | |
| 9 (stop) | ∞ | 0.40 | | | 9.43 | |
| 10 | 10.803 | 3.42 | 1.58144 | 40.8 | 9.59 | |
| 11 | −17.862 | 0.80 | 1.88300 | 40.8 | 9.10 | |
| 12 | 13.424 | 1.48 | | | 8.77 | |
| 13 | 10.350 | 5.03 | 1.49700 | 81.5 | 9.38 | |
| 14 | −18.253 | 1.48 | | | 8.96 | |
| 15 | 32.518 | 3.47 | 1.48749 | 70.2 | 9.30 | |
| 16 | −7.420 | 1.00 | 1.85135 | 40.1 | 9.31 | |
| 17* | −32.761 | (variable) | | | 10.01 | |
| 18 | −615.834 | 1.67 | 1.80810 | 22.8 | 10.64 | Positive lens PL |
| 19 | −34.549 | 0.60 | 1.73800 | 32.3 | 10.93 | Negative lens NL |
| 20 | 23.722 | (variable) | | | 11.31 | |
| 21 | 53.222 | 6.63 | 1.59270 | 35.3 | 17.14 | |
| 22 | −12.252 | 1.20 | 1.83481 | 42.7 | 17.88 | |
| 23 | −52.965 | (variable) | | | 20.19 | |
| Image plane | ∞ | | | | | |

Aspheric surface data

1st surface

K = 0.00000e+000
A4 = 3.03598e−005
A6 = −8.29581e−008
A8 = 8.88357e−011
A10 = 3.29148e−014

2nd surface

K = −9.21567e−001
A4 = 9.05160e−005
A6 = 5.39728e−008
A8 = 6.59217e−009
A10 = −4.28049e−011

17th surface

K = 0.00000e+000
A4 = 7.82970e−005
A6 = 1.64788e−007
A8 = 3.15159e−008
A10 = −2.78476e−010

Various data

Zoom ratio 1.93

| | Wide angle | Middle | Telephoto |
|---|---|---|---|
| Focal length | 11.33 | 15.16 | 21.84 |
| F-NUMBER | 4.10 | 4.65 | 5.72 |
| Half angle of view (deg) | 50.33 | 42.03 | 32.02 |
| Image height | 13.66 | 13.66 | 13.66 |
| Total lens length | 88.44 | 85.64 | 87.26 |
| BF | 9.00 | 14.02 | 22.72 |
| d6 | 16.99 | 9.16 | 2.09 |
| d17 | 1.30 | 1.58 | 1.98 |
| d20 | 6.91 | 6.62 | 6.23 |
| d23 | 9.00 | 14.02 | 22.72 |

Lens unit data

| Lens | Start surface | Focal length |
|---|---|---|
| 1 | 1 | −15.65 |
| 2 | 7 | 18.66 |
| 3 | 18 | −32.87 |
| 4 | 21 | 135.10 |

Single lens data

| Lens | Start surface | Focal length |
|---|---|---|
| 1 | 1 | −20.05 |
| 2 | 3 | −16.29 |
| 3 | 5 | 25.26 |
| 4 | 7 | 64.67 |
| 5 | 10 | 12.11 |
| 6 | 11 | −8.58 |
| 7 | 13 | 14.11 |
| 8 | 15 | 12.76 |
| 9 | 16 | −11.48 |
| 10 | 18 | 45.24 |
| 11 | 19 | −18.98 |
| 12 | 21 | 17.46 |
| 13 | 22 | −19.35 |

TABLE 1

| | | Embodiment 1 | Embodiment 2 | Embodiment 3 | Embodiment 4 |
|---|---|---|---|---|---|
| PL | Material Name | S-NPH3 | S-NPH4 | S-NPH3 | S-NPH1 |
| | Manufacturer | OHARA INC. | OHARA INC. | OHARA INC. | OHARA INC. |
| | Specific Gravity [g/cm3] | 3.59 | 3.61 | 3.59 | 3.29 |
| | NdPL | 1.9591 | 1.8929 | 1.9591 | 1.8081 |
| | vdPL | 17.47 | 20.36 | 17.47 | 22.76 |
| | θgFPL | 0.6598 | 0.6393 | 0.6598 | 0.6307 |
| | θgFaPL | 0.6430 | 0.6318 | 0.6430 | 0.6231 |
| NL | Material Name | NBFD15 | S-NBH51 | S-NBH53 | S-NBH53 |
| | Manufacturer | HOYA CORPORATION | OHARA INC. | OHARA INC. | OHARA INC. |
| | Specific Gravity [g/cm3] | 3.47 | 3.29 | 3.28 | 3.28 |
| | NdPL | 1.8061 | 1.7495 | 1.7380 | 1.7380 |
| | vdPL | 33.27 | 35.33 | 32.26 | 32.26 |
| | θgFNL | 0.5883 | 0.5818 | 0.5899 | 0.5899 |
| | θgFaNL | 0.5902 | 0.5847 | 0.5930 | 0.5930 |

TABLE 2

| | | Embodiment 1 | Embodiment 2 | Embodiment 3 | Embodiment 4 |
|---|---|---|---|---|---|
| Conditional Expression (1) | vdNL | 33.27 | 35.33 | 32.26 | 32.26 |
| | NdNL | 1.806 | 1.750 | 1.738 | 1.738 |

TABLE 2-continued

| | | Embodiment 1 | Embodiment 2 | Embodiment 3 | Embodiment 4 |
|---|---|---|---|---|---|
| Conditional Expression (2) | $NdNL - 0.0003 \times vdNL^2 + 0.034 \times vdNL$ | 2.61 | 2.58 | 2.52 | 2.52 |
| Conditional Expression (3) | vdPL | 17.47 | 20.36 | 17.47 | 22.76 |
| Conditional Expression (4) | θgFNL | 0.5883 | 0.5818 | 0.5899 | 0.5899 |
| Conditional Expression (5) | θgFNL − θgFaNL | −0.0019 | −0.0029 | −0.0031 | −0.0031 |
| Conditional Expression (6) | θgFPL | 0.6598 | 0.6393 | 0.6598 | 0.6307 |
| Conditional Expression (7) | θgFPL − θgFaPL | 0.0168 | 0.0074 | 0.0168 | 0.0076 |
| Conditional Expression (8) | $DNL - (-3.1 \times NdNL^2 + 14.7 \times NdNL - 12.5)$ | −0.467 | −0.439 | −0.405 | −0.405 |
| Conditional Expression (9) | $DPL - (-3.1 \times NdPL^2 + 14.7 \times NdPL - 12.5)$ | −0.811 | −0.608 | −0.811 | −0.654 |
| Conditional Expression (10) | NdPL | 1.959 | 1.893 | 1.959 | 1.808 |
| Conditional Expression (11) | DNL | 3.47 | 3.29 | 3.28 | 3.28 |
| Conditional Expression (12) | DPL | 3.59 | 3.61 | 3.59 | 3.29 |
| | vdNL/vdPL | 1.90 | 1.74 | 1.85 | 1.42 |
| | (R1NL + R2NL)/(R1NL − R2NL) | 0.062 | 0.635 | 0.190 | 0.186 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-179276, filed Sep. 14, 2016, which is hereby incorporated by reference herein in its entirety.

What is claimed is:

1. An optical system comprising:
an aperture stop; and
a focus lens unit arranged on an image side of the aperture stop, the focus lens unit having a negative refractive power and moving during focusing, wherein
the focus lens unit moves toward the image side during focusing from infinity to close distance and includes a positive lens PL and a negative lens NL, and
the following conditional expressions are satisfied:

$$23.0 < vdNL < 40.0;$$

$$2.44 < NdNL - 0.0003 \times vdNL^2 + 0.034 \times vdNL < 2.64; \text{ and}$$

$$vdPL < 23.0,$$

where vdNL denotes an Abbe number of a material of the negative lens NL, NdNL denotes a refractive index of the material of the negative lens NL at d-line, and vdPL denotes an Abbe number of a material of the positive lens PL.

2. The optical system according to claim 1, wherein provided that vd denotes an Abbe number of a material, θgF denotes a partial dispersion ratio of the material based on g-line and F-line, and θgFa denotes a standard partial dispersion ratio and is defined as $$\theta gFa = -1.665 \times 10^{-7} \times vd^3 + 5.213 \times 10^{-5} \times vd^2 - 5.656 \times 10^{-3} \times vd + 0.7268,$$

the following conditional expression is satisfied, $$\theta gFNL < \theta gFaNL,$$

where θgFNL denotes a partial dispersion ratio of the material of the negative lens NL based on the g-line and the F-line, and θgFaNL denotes a standard partial dispersion ratio of the material of the negative lens NL.

3. The optical system according to claim 1, wherein provided that vd denotes an Abbe number of a material, θgF denotes a partial dispersion ratio of the material based on g-line and F-line, and θgFa denotes a standard partial dispersion ratio and is defined as $$\theta gFa = -1.665 \times 10^{-7} \times vd^3 + 5.213 \times 10^{-5} \times vd^2 - 5.656 \times 10^{-3} \times vd + 0.7268,$$

the following conditional expression is satisfied, $$\theta gFaPL < \theta gFPL,$$

where θgFPL denotes a partial dispersion ratio of the material of the positive lens PL based on the g-line and the F-line, and θgFaPL denotes a standard partial dispersion ratio of the material of the positive lens PL.

4. The optical system according to claim 1, wherein the following conditional expression is satisfied, $$DNL < -3.1 \times NdNL^2 + 14.7 \times NdNL - 12.5,$$

where DNL denotes a specific gravity of the material of the negative lens NL.

5. The optical system according to claim 1, wherein the following conditional expression is satisfied, $$DPL < -3.1 \times NdPL^2 + 14.7 \times NdPL - 12.5,$$

where NdPL denotes a refractive index of the material of the positive lens PL at the d-line, and DPL denotes a specific gravity of the material of the positive lens PL.

6. The optical system according to claim 1, wherein the following conditional expression is satisfied, $$1.80 < NdPL,$$

where NdPL denotes a refractive index of the material of the positive lens PL at the d-line.

7. The optical system according to claim 1, wherein the following conditional expression is satisfied, $$DNL < 3.70,$$

where DNL denotes a specific gravity of the material of the negative lens NL.

8. The optical system according to claim 1, wherein the following conditional expression is satisfied, $$DPL < 3.70,$$

where DPL denotes a specific gravity of the material of the positive lens PL.

9. The optical system according to claim 1, wherein the following conditional expression is satisfied, $$1.2 < vdNL/vdPL < 2.2.$$

10. The optical system according to claim 1, wherein the following conditional expression is satisfied, $$0.0 < (R1NL + R2NL)/(R1NL - R2NL) < 1.0,$$

where R1NL denotes a radius of curvature of an object-side lens surface of the negative lens NL and R2NL denotes a radius of curvature of an image-side lens surface of the negative lens NL.

11. The optical system according to claim 1, wherein the focus lens unit consists of the positive lens PL and the negative lens NL.

12. The optical system according to claim 1, wherein the optical system consists, in order from an object side to the image side, of a first lens unit having a positive refractive power, the aperture stop, a second lens unit having a negative refractive power, and a third lens unit having a positive refractive power, and the second lens unit is the focus lens unit and moves during focusing.

13. The optical system according to claim 1, wherein the optical system consists, in order from an object side to the image side, of a first lens unit having a positive refractive power, a second lens unit having a negative refractive power, the aperture stop, a third lens unit having a positive refractive power, a fourth lens unit having a positive refractive power, a fifth lens unit having a positive refractive power, a sixth lens unit having a negative refractive power, a seventh lens unit having a negative refractive power, and an eighth lens unit having a positive refractive power, a distance between each pair of neighboring ones of the lens units changes during zooming, and the sixth lens unit is the focus lens unit that moves during focusing.

14. The optical system according to claim 1, wherein the optical system consists, in order from an object side to the image side, of a first lens unit having a negative refractive power, a second lens unit having a positive refractive power, a third lens unit having a negative refractive power, the aperture stop, a fourth lens unit having a positive refractive power, a fifth lens unit having a negative refractive power, and a sixth lens unit having a positive refractive power, a distance between each pair of neighboring ones of the lens units changes during zooming, and the fifth lens unit is the focus lens unit that moves during focusing.

15. The optical system according to claim 1, wherein the optical system consists, in order from an object side to the image side, of a first lens unit having a negative refractive power, a second lens unit having a positive refractive power, a third lens unit having a negative refractive power, and a fourth lens unit having a positive refractive power, a distance between each pair of neighboring ones of the lens units changes during zooming, the aperture stop is arranged inside the second lens unit, and the third lens unit is the focus lens unit that moves during focusing.

16. An image pickup apparatus comprising:
an optical system; and
an image pickup element which receives a light image formed by the optical system, wherein the optical system includes an aperture stop, and a focus lens unit arranged on an image side of the aperture stop, the focus lens unit having a negative refractive power and moving during focusing, the focus lens unit moves toward the image side during focusing from infinity to close distance, and includes a positive lens PL and a negative lens NL, and the following conditional expressions are satisfied:

$$23.0 < vdNL < 40.0;$$

$$2.44 < NdNL - 0.0003 \times vdNL^2 + 0.034 \times vdNL < 2.64; \text{ and}$$

$$vdPL < 23.0,$$

where vdNL denotes an Abbe number of a material of the negative lens NL, NdNL denotes a refractive index of the material of the negative lens NL at d-line, and vdPL denotes an Abbe number of a material of the positive lens PL.

* * * * *